US006874635B2

(12) United States Patent
Curtsinger

(10) Patent No.: US 6,874,635 B2
(45) Date of Patent: Apr. 5, 2005

(54) METHOD AND APPARATUS TO PROTECT SAW BLADE TIPS

(75) Inventor: John Curtsinger, Shelbyville, KY (US)

(73) Assignee: Black & Decker Inc., Newark, DE (US)

( * ) Notice: Subject to any disclaimer, the term of this patent is extended or adjusted under 35 U.S.C. 154(b) by 246 days.

(21) Appl. No.: 09/998,477

(22) Filed: Nov. 30, 2001

(65) Prior Publication Data

US 2003/0101601 A1 Jun. 5, 2003

(51) Int. Cl.$^7$ .......................... A45C 11/26; B27B 21/00; B65B 11/58
(52) U.S. Cl. .......................... 206/497; 206/349; 30/504
(58) Field of Search ...................... 30/504, 165, 166.3; 206/497, 349, 373, 303, 304.1, 30.2, 395, 389, 393, 414, 353, 352, 372, 398, 46, 76, 461, 493, 815, 307, 309; 53/442, 557, 449, 441; D9/915, 429, 428, 444, 337

(56) References Cited

U.S. PATENT DOCUMENTS

| | | | |
|---|---|---|---|
| 102,923 A | 5/1870 | Disston | |
| 716,785 A | 12/1902 | Taylor | |
| 1,640,022 A | * 8/1927 | Angier | 206/304 |
| 2,010,082 A | 8/1935 | Hill | |
| D99,549 S | 5/1936 | Klein | |
| 2,459,460 A | 1/1949 | Segal | |
| 2,598,192 A | * 5/1952 | Poust | 206/591 |
| 2,601,426 A | 6/1952 | Baumann | |
| 2,878,628 A | * 3/1959 | Curry | 53/409 |
| 2,918,165 A | * 12/1959 | Paulick, Jr. | 206/349 |
| 2,950,004 A | 8/1960 | Acomb | |
| 2,954,118 A | * 9/1960 | Anderson | 206/349 |
| 3,005,542 A | 10/1961 | Harrison | |
| 3,018,883 A | * 1/1962 | Wohlforth | 206/396 |
| 3,096,877 A | * 7/1963 | Skarsten | 206/378 |
| 3,259,231 A | 7/1966 | Romanowski et al. | |
| 3,274,302 A | 9/1966 | Anderson et al. | |
| 3,326,250 A | * 6/1967 | Kephart, Jr. | 30/151 |
| 3,358,902 A | 12/1967 | Emmert et al. | |
| 3,412,524 A | * 11/1968 | Nestell et al. | 53/212 |
| 3,967,727 A | * 7/1976 | Jakesch | 206/344 |
| 4,071,141 A | 1/1978 | Gray | |
| 4,098,577 A | * 7/1978 | Halpern | 436/1 |
| 4,174,037 A | * 11/1979 | Chow | 206/378 |
| 4,282,973 A | * 8/1981 | Binkowski | 206/308.3 |
| 4,369,575 A | * 1/1983 | Schurman | 30/151 |
| 4,566,923 A | * 1/1986 | Mueller | 156/69 |
| 4,696,394 A | * 9/1987 | Estkowski et al. | 206/303 |
| 4,876,843 A | * 10/1989 | O'Brien et al. | 53/410 |
| D311,620 S | 10/1990 | Rose | |
| 5,033,253 A | * 7/1991 | Havens et al. | 53/427 |
| 5,114,012 A | * 5/1992 | Mushinski et al. | 206/523 |
| 5,145,283 A | * 9/1992 | Gowen | 405/157 |
| 5,154,289 A | * 10/1992 | Van Erden | 206/432 |
| 5,211,322 A | * 5/1993 | Nealy | 224/232 |
| 5,419,933 A | * 5/1995 | Tsukada et al. | 428/34.1 |
| 5,456,057 A | 10/1995 | Bannon et al. | |
| 5,819,931 A | * 10/1998 | Boucher et al. | 206/349 |
| 6,029,815 A | * 2/2000 | Ali | 206/349 |
| 6,260,698 B1 | 7/2001 | Delost et al. | |
| 6,267,239 B1 | 7/2001 | Maki | |
| D449,522 S | 10/2001 | Brown | |
| 6,484,875 B1 | 11/2002 | Brainerd et al. | |

* cited by examiner

Primary Examiner—Allan N. Shoap
Assistant Examiner—Ghassem Alie
(74) Attorney, Agent, or Firm—Harness, Dickey & Pierce, P.L.C.

(57) ABSTRACT

A preformed heat shrinking protective cover for a saw blade includes first and second portions each having opposite inner and outer surfaces. The second portion extends from the first portion at an angle relative to the first portion. The first and second portions are configured and adapted for a saw blade to be positioned in contact with the inner surface of the first portion. The first and second portions are made from a heat shrinking material so that when heat is applied to the cover, the second portion shrinks and folds over the first portion with the inner surfaces facing each other and teeth on a saw blade can be retained between the first and second portions. The resulting cover is close fitting and reduces the overall thickness of a saw blade with a protective cover.

7 Claims, 10 Drawing Sheets

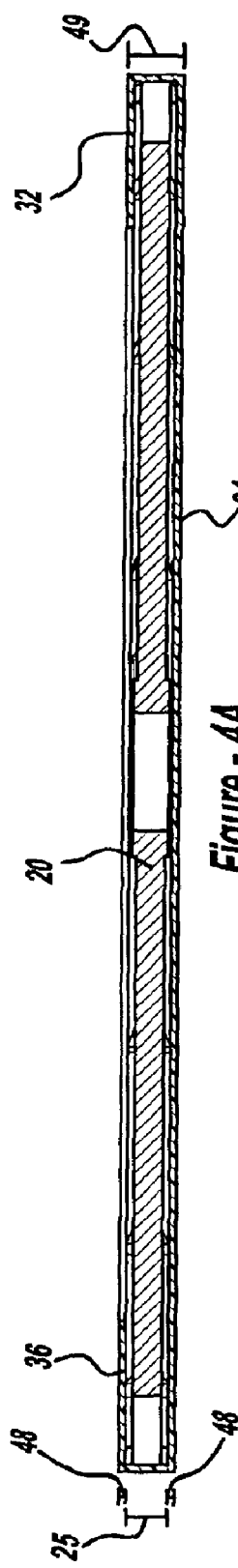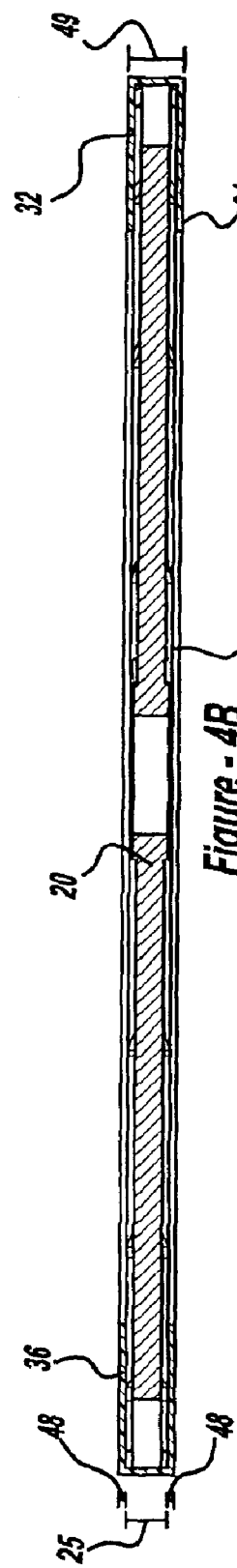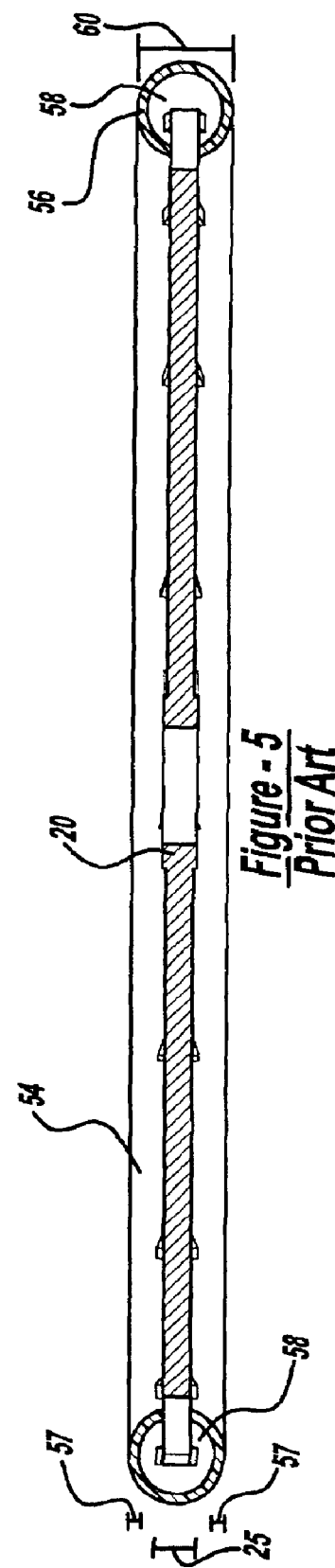

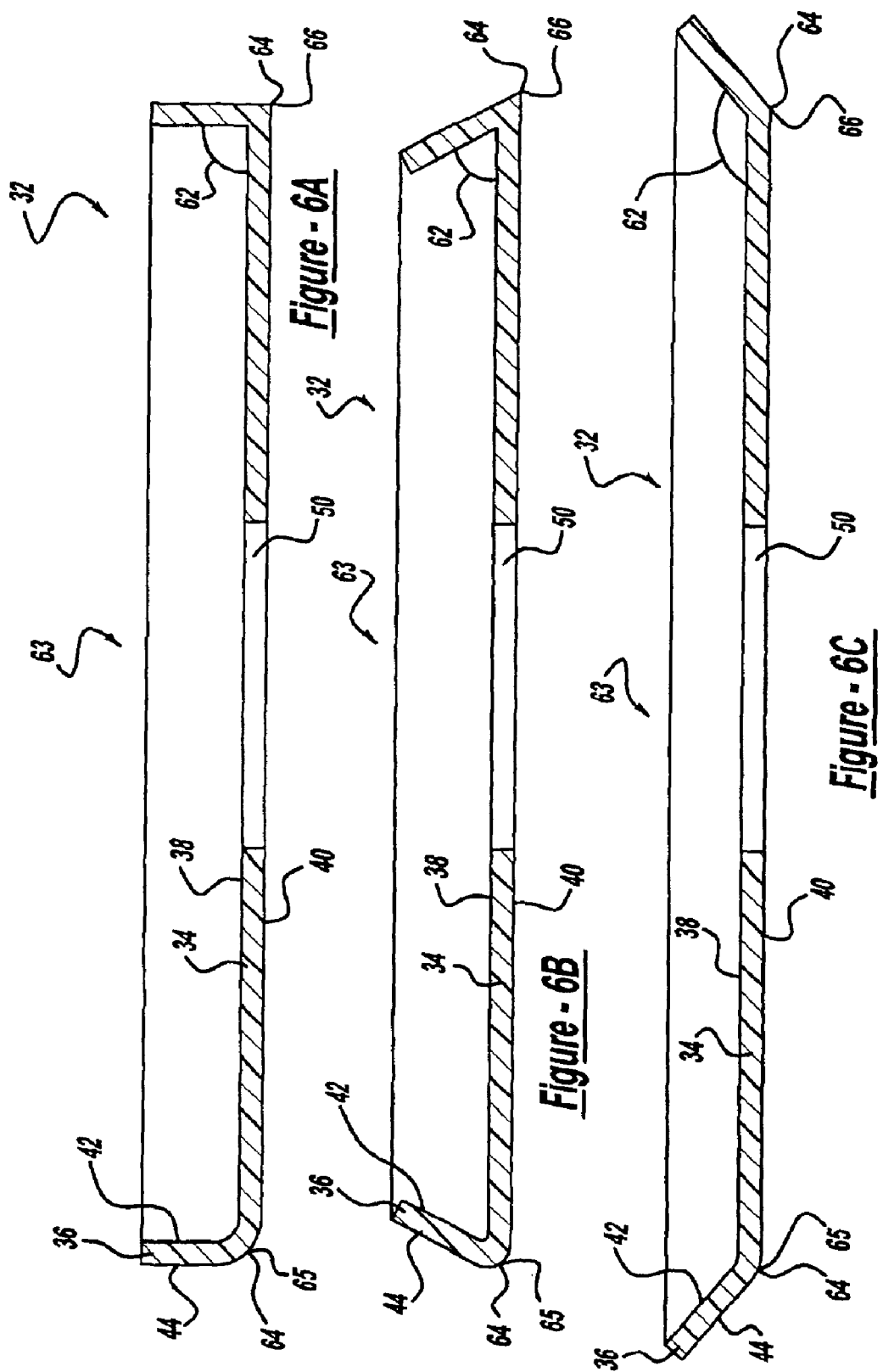

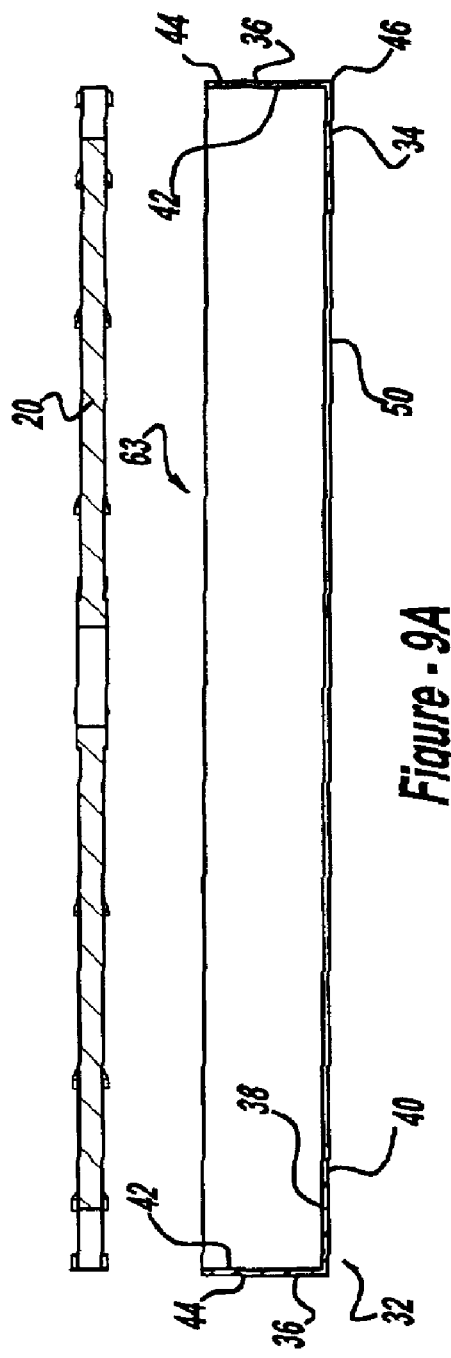
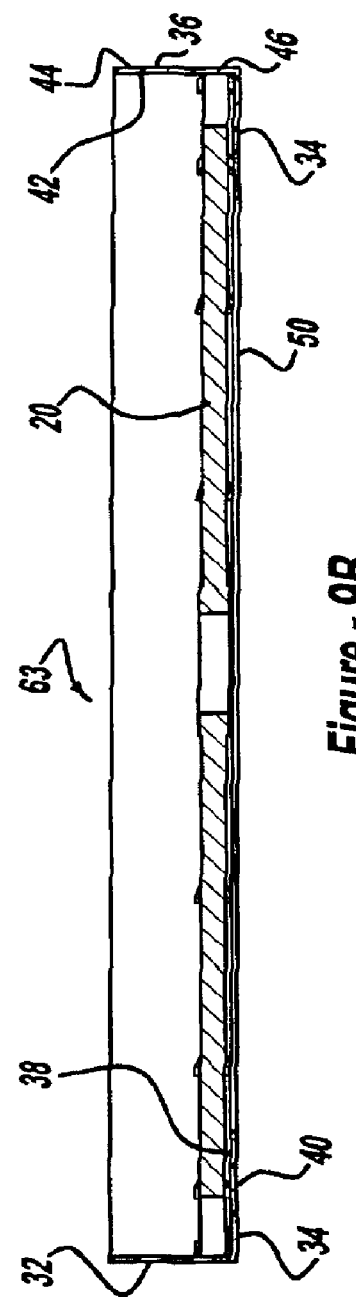

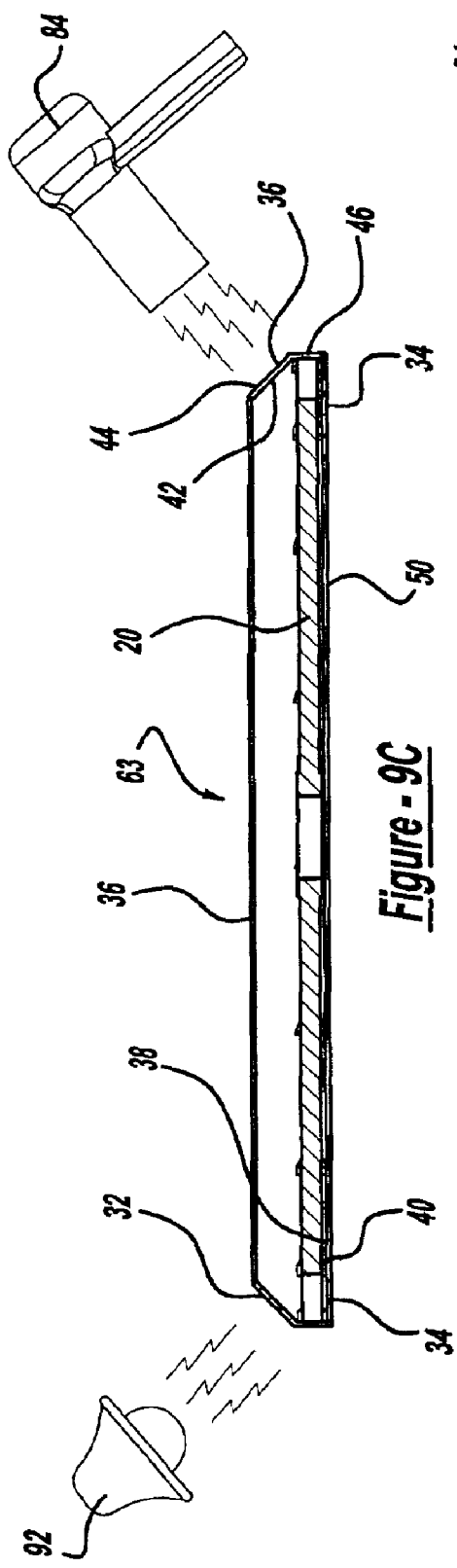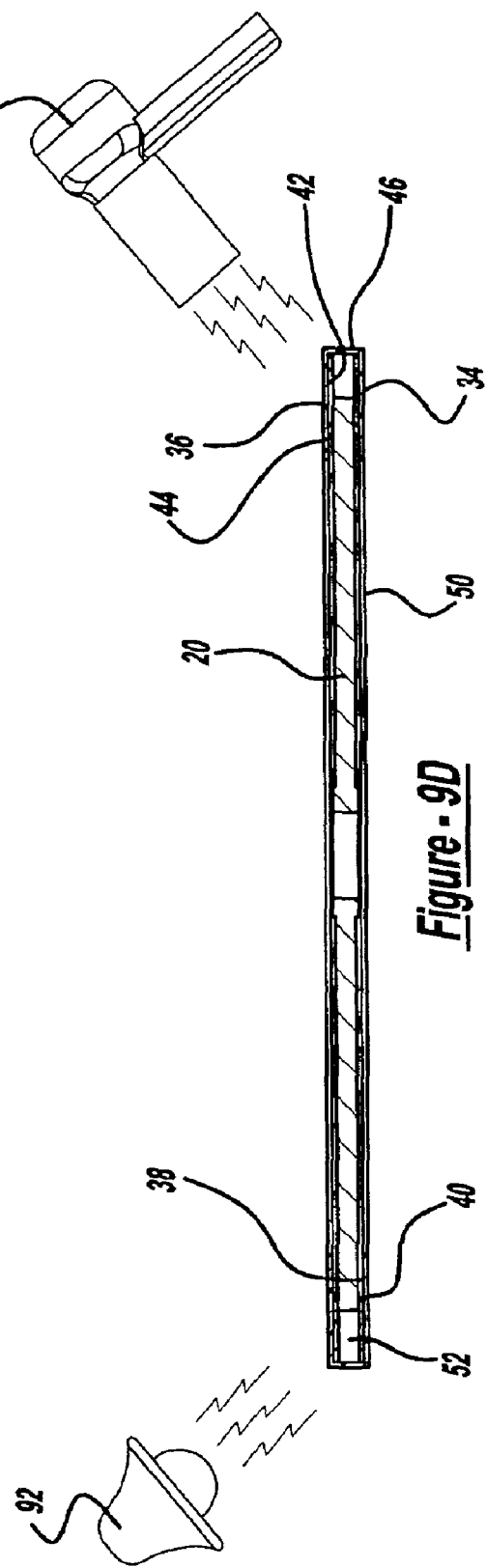

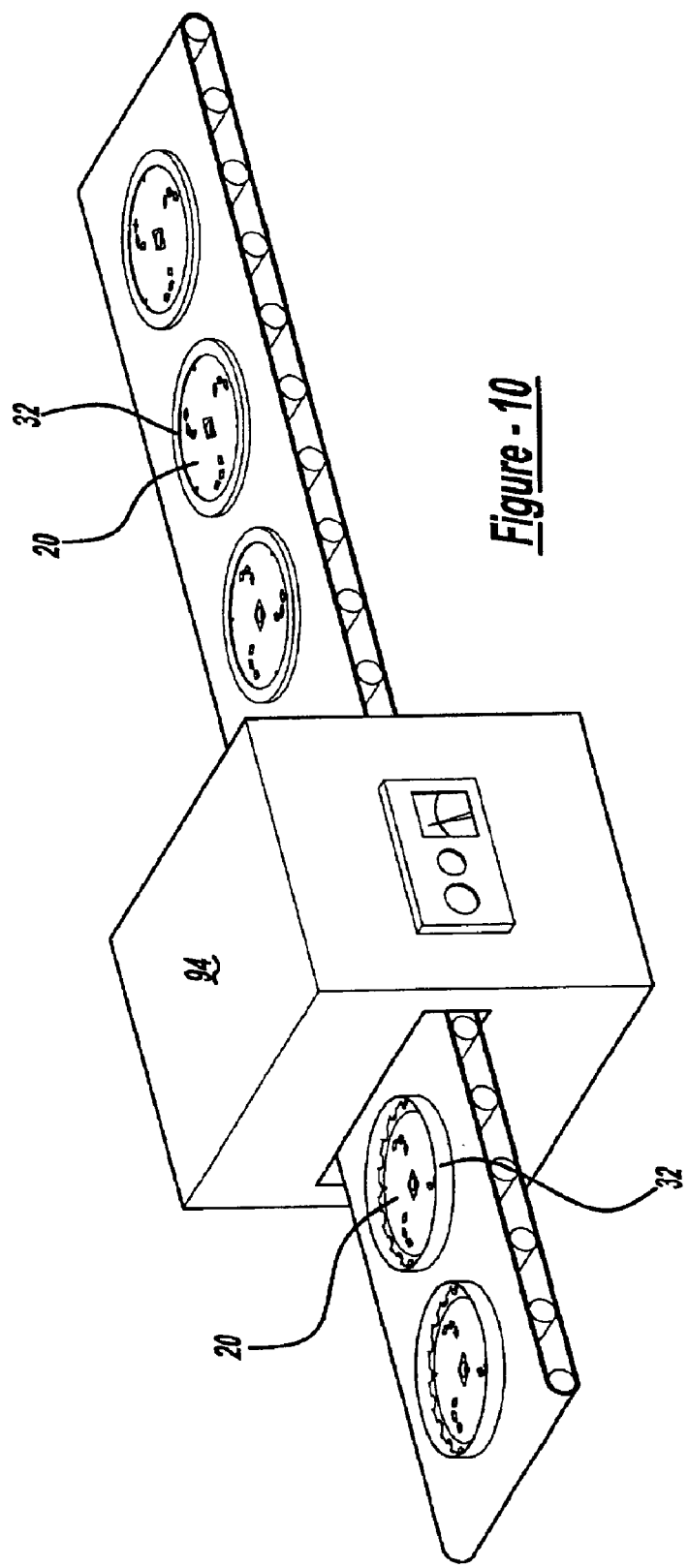

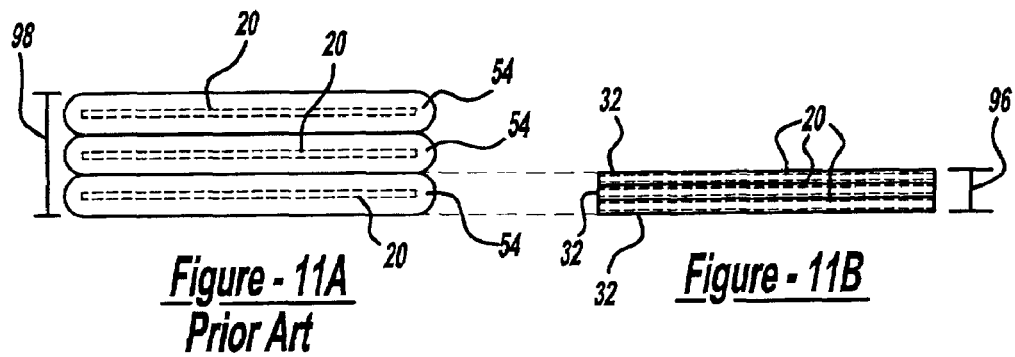
Figure - 11A
*Prior Art*
Figure - 11B
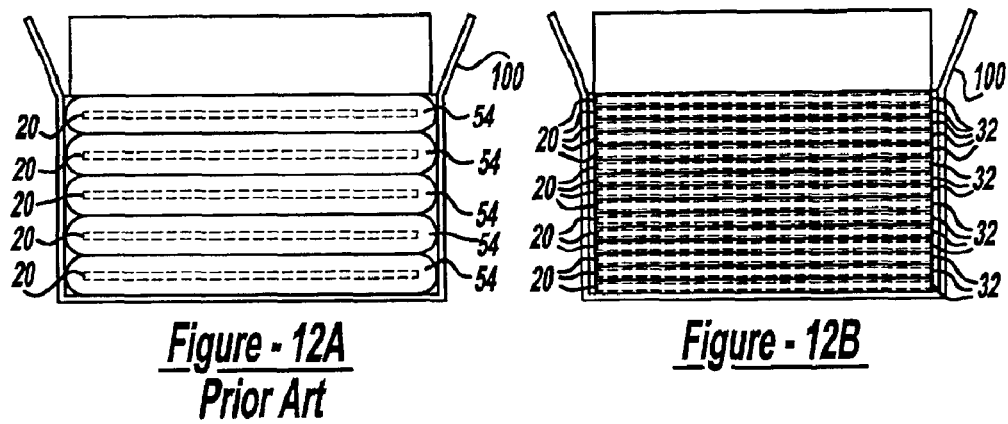
Figure - 12A
*Prior Art*
Figure - 12B

METHOD AND APPARATUS TO PROTECT SAW BLADE TIPS

FIELD OF THE INVENTION

The present invention relates to saw blades and, more particularly, to saw blades having a protective cover that protects the teeth on the saw blade.

BACKGROUND OF THE INVENTION

Saw blades come in a variety of shapes and forms. For example, saw blades can be of the circular type that have teeth that extend around the periphery of the circular saw blade. Saw blades can also be of the reciprocating type that are linear and have teeth along one peripheral edge of the linear blade. The teeth on the saw blades are sharp and can injure a person handling the blades if care is not exercised. Additionally, the sharp teeth on the saw blades can damage other objects or goods that inadvertently come in contact with the teeth. Furthermore, the teeth can have special tips, such as carbide tips, that can be damaged if the blade is mishandled or dropped. Therefore, saw blades are typically packaged with a protective cover that encloses the teeth and prevents accidental injury or damage to a person, other goods, or the teeth of a saw blade.

The typical prior art covers used on saw blades use flexible plastic tubing that has a single cut through the tubing wall along the length of the tubing, such as disclosed in commonly assigned U.S. Pat. No. 5,456,057. The tubing is wrapped around the periphery of the saw blade with the teeth extending into an interior of the tubing through the cut along the length of the tubing. The tubing thereby encloses the teeth of the saw blade and provides a protective cover for the teeth of the saw blade. Because the tubing has a circular cross section while the saw blade is relatively flat, the tubing is not close fitting to the saw blade and is substantially thicker than the saw blade. The tubing thereby provides a protective cover that significantly adds to the overall thickness of the protected saw blade.

The increased overall thickness of the saw blade having the protective cover increases the space that each saw blade with the protective cover occupies. For example, the increased overall thickness substantially increases the height of a stack of saw blades having the protective cover over the height of a stack of the same number of saw blades without the protective cover. The increased thickness has a number of drawbacks. For example, the increased overall thickness requires a larger display area at a store to display a given number saw blades over those without the protective cover. Additionally, the saw blades are typically shipped in boxes of a fixed dimension. Because the saw blades with the protective covers have an overall thickness substantially larger than the saw blade itself, less saw blades with the protective cover can be fit within the fixed dimension box than the number of saw blades that can fit within the fixed dimension box that do not have the protective cover. The decreased number of saw blades with a protective cover that can fit in the fixed dimension box thereby increases the box waste per saw blade packaged in the box. That is, if the fixed dimension box can normally hold twenty saw blades that do not have the protective cover but can only hold five saw blades that have the protective cover, the box waste per blade is increased four fold and results in more packaging waste per blade shipped to a buyer. Furthermore, the decreased capacity of the fixed dimension box increases the packaging and shipping cost for a provider of saw blades with the protective cover.

Therefore, what is needed is a protective cover that protects the teeth of a saw blade but results in an overall thickness that is less than that achieved with the use of the prior art protective covers. By reducing the overall thickness of the saw blade with a protective cover, the stack height for a given number of saw blades can be reduced. The reduced stack height for a given number of saw blades allows for more saw blades having a protective cover to be placed in the fixed dimension box which thereby decreases the box waste per saw blade packaged in the fixed dimension box and decreases the overall cost of packaging and shipping per saw blade. Additionally, the reduction in the thickness of a saw blade having a protective cover decreases the amount of space required to display a given number of blades in a store.

SUMMARY OF THE INVENTION

The present invention is directed to the use of a heat shrinking material to provide a protective cover for the teeth of a saw blade that results in a saw blade having a protective cover that has an overall thickness that is less than that of a saw blade having the prior art protective cover. The present invention thereby provides a method of protecting the teeth of a saw blade, a method of stacking saw blades having protective covers, and a method of packaging saw blades having protective covers. The present invention is also directed to a method for manufacturing a saw blade having such a protective cover.

In one aspect of the present invention, a preformed protective cover for a saw blade comprises first and second portions that each have opposite inner and outer surfaces. The second portion extends from the first portion at an angle relative to the first portion so that the first and second portions are not co-planar. The first and second portions are configured and adapted to allow a saw blade to be positioned in contact with the inner surface of the first portion. The first and second portions are made from a heat shrinking material so that when heat is applied to the first and second portions, the second portion folds over the first portion with the inner surface of the second portion facing inner surface of the first portion. The folding over of the second portion over the first portion allows teeth on a saw blade positioned in contact with the inner surface of the first portion to be retained between the first and second portions.

When the saw blade is circular, the first portion preferably has a generally circular peripheral edge from which the second portion extends. The first portion can also have a central opening that is generally circular so that the first and second portions form a ring shape with an annular channel between the inner surfaces of the first and second portions that can retain and protect the teeth of a saw blade. The second portion can extend from the first portion at a variety of angles. In one embodiment, the second portion extends from the first portion at generally a 90° angle so that the preformed cover has a generally "L" shaped cross section. In a different embodiment, the second portion extends from the first portion at an acute angle so that the inner surface of the second portion faces the inner surface of the first portion prior to being heated. In another different embodiment, the second portion extends from the first portion at an obtuse angle so that the inner surface of the second portion does not face the inner surface of the first portion prior to being heated.

Optionally, but preferably, the second portion extends from a periphery of the first portion and forms a corner at the periphery of the first portion. The corner can be rounded, or alternatively, the corner can be comprised of straight segments so that the corner is generally acute.

A different aspect of the present invention includes a saw blade having a protective cover. The saw blade has opposite first and second sides and a peripheral edge. A plurality of teeth extend along a portion of the peripheral edge. There is a cover that is made of a heat shrinking material that shrinks and covers the teeth of the saw blade when heat is applied to the cover. The cover has first and second portions with opposite inner and outer surfaces. The first portion of the cover is disposed against the first side of the saw blade. The second portion is folded over the first portion with the inner surface of the second portion facing the second side of the saw blade and securing portions of the first and second sides of the saw blade and the teeth between the first and second portions.

Another aspect of the present invention includes a method of protecting teeth of a saw blade having opposite first and second sides. The method includes the steps of: 1) positioning a saw blade adjacent a heat shrinking material so that at least one of a periphery of the saw blade or a first side of the saw blade is in contact with the heat shrinking material; and 2) heating the heat shrinking material so that the heat shrinking material shrinks and covers teeth of the saw blade thereby forming a protective cover.

Optionally, prior to performing the step of positioning the saw blade, the method can further comprise the step of preforming the heat shrinking material so that the heat shrinking material has first and second portions with the second portion extending from the first portion at an angle relative to the first portion so that the first and second portions are not co-planar. The step of positioning the saw blade may include positioning the saw blade adjacent the preformed heat shrinking material so that at least one of the periphery of the saw blade or the first side of the saw blade is in contact with the first portion. When the heat shrinking material is preformed, the step of heating the heat shrinking material may include heating the preformed heat shrinking material so that the second portion folds over the first portion and covers a portion of a second side of the saw blade thereby securing the saw blade between the first and second portions of the heat shrinking material.

Optionally, but preferably, the step of preforming the heat shrinking material can include the steps of: A) placing the heat shrinking material in a mold; B) pressing the heat shrinking material within the mold into a predetermined shape; C) applying heat to the heat shrinking material within the mold so that the heat shrinking material shrinks within the mold and will maintain the predetermined shape when removed from the mold; and D) removing the heat shrinking material from the mold.

Also optionally, but preferably, the step of preforming the heat shrinking material can include forming the first portion of the heat shrinking material into a generally ring shaped configuration with the first portion having a central opening. The second portion extends from the first portion along an outer periphery of the ring shaped first portion.

The step of heating the heat shrinking material can be performed in a variety of ways. For example, the heat shrinking material can be heated by forcing a heated fluid across the heat shrinking material. Alternatively, the heat shrinking material can also be heated with radiant heat, UV light, or by passing the heat shrinking material through a heat tunnel and heating the heat shrinking material as the heat shrinking material passes through the heat tunnel. Optionally, but preferably, the step of heating the heat shrinking material comprises uniformly heating the heat shrinking material. Also optionally, but preferably, the heat shrinking material is PVC.

In another aspect of the present invention, a method for stacking saw blades having protective covers is disclosed. The method includes the steps of: 1) positioning a saw blade adjacent a heat shrinking material so that at least one of a periphery of the saw blade or a first side of the saw blade is in contact with the heat shrinking material; 2) heating the heat shrinking material so that the heat shrinking material shrinks and covers teeth on the saw blade thereby forming a protective cover; and 3) stacking the saw blade with the protective cover on other saw blades having protective covers so that thicknesses of the saw blades are aligned and a stack of saw blades is formed.

In yet another aspect of the present invention, a method is provided for packaging saw blades having protective covers. The method includes the steps of: 1) positioning a saw blade adjacent a heat shrinking material so that at least one of a periphery of the saw blade or a first side of the saw blade is in contact with the heat shrinking material; 2) heating the heat shrinking material so that the heat shrinking material shrinks and covers teeth on the saw blade thereby forming a protective cover; and 3) placing the saw blade with the protective cover in a fixed dimension box along with other saw blades having a protective cover with an overall thickness of each saw blade being aligned.

In still another aspect of the present invention, a method is provided for manufacturing a saw blade having a protective cover. The method includes the steps of: 1) preforming a heat shrinking material so that the heat shrinking material has first and second portions with the second portion extending from the first portion at an angle relative to the first portion so that the first and second portions are not co-planar; 2) positioning a saw blade adjacent the preformed heat shrinking material so that at least one of a periphery of the saw blade or a first side of the saw blade is in contact with the first portion; and 3) heating the preformed heat shrinking material so that the preformed heat shrinking material shrinks and covers teeth on the saw blade thereby forming a protective cover.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a cross sectional view of the saw blade within the protective cover taken along line 4—4 of FIG. 3 showing the protective cover having a solid bottom surface;

FIG. 4B is a cross sectional view of the saw blade within the protective cover taken along line 4—4 of FIG. 3 showing the protective cover having a bottom surface with a central opening;

FIG. 5 is a cross sectional view of the saw blade of FIG. 1 within a prior art protective cover;

FIGS. 6A–C are cross sectional views of various embodiments of the preformed cover of the present invention;

FIGS. 9A–D are cross sectional views of the preformed protective cover of the present invention showing the various steps of positioning the saw blade within the preformed protective cover and applying heat to the preformed protective cover via a heat gun and/or a radiant heat source to cause the preformed protective cover to shrink around the saw blade and form the protective cover of the present invention;

FIG. 10 shows the heating of the preformed protective cover with a saw blade positioned in the cover by passing the preformed protective cover with the saw blade through a heat tunnel to form a saw blade having a protective cover of the present invention;

FIGS. 11A–B illustrates the stack heights of saw blades having the prior art protective cover (FIG. 11A) and having the protective cover of the present invention (FIG. 11B); and FIGS. 12A–B illustrates the number of saw blades having the prior art protective cover (FIG. 12A) and the number of saw blades having the protective cover of the present invention (FIG. 12B) that can fit within a fixed dimension box.

DETAILED DESCRIPTION OF THE PREFERRED EMBODIMENTS

The following description of the preferred embodiment(s) is merely exemplary in nature and is in no way intended to limit the invention, its application, or uses.

Figure 1:
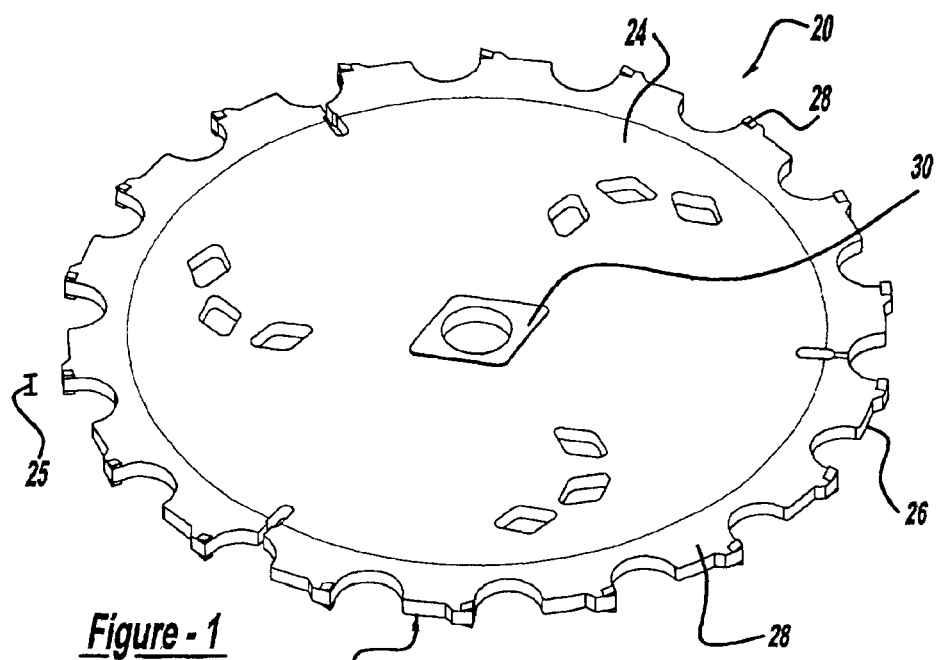
FIG. 1 is a perspective view of a circular type saw blade.

Referring to FIG. 1, a saw blade 20 having opposite first and second sides 22, 24 with a thickness 25 therebetween and a peripheral edge 26 is shown. A plurality of teeth 28 are positioned along the peripheral edge 26 of the saw blade 20. The number of teeth 28 will vary depending upon the application for which the saw blade 20 is intended to be used. The teeth 28 may have tips 29 that are made of a special material to accommodate the application in which the saw blade 20 is intended to be used. For example, the teeth 28 can have carbide tips, diamond tips, etc. that will vary for the application in which the saw blade 20 is to be used. The saw blade 20 has a central opening 30 that allows the saw blade 20 to be mounted on a power tool (not shown). The saw blade 20 shown in FIG. 1 is a circular saw blade. Circular saw blades can come in a variety of diameters, as is known in the art. For example, the saw blade can come in a 7¼" diameter, a 12" diameter, etc. The saw blade 20 can also come in a variety of shapes other than circular. For example, the saw blade 20 can be a straight or linear saw blade (not shown) that has teeth that extend along one peripheral edge of the linear saw blade. While the saw blade 20 will be shown and discussed as being a circular type saw blade 20, it should be understood that the invention can also be used on linear type saw blades, as will be apparent to those skilled in the art, and still be within the scope of the invention as defined by the claims.

Figure 2:
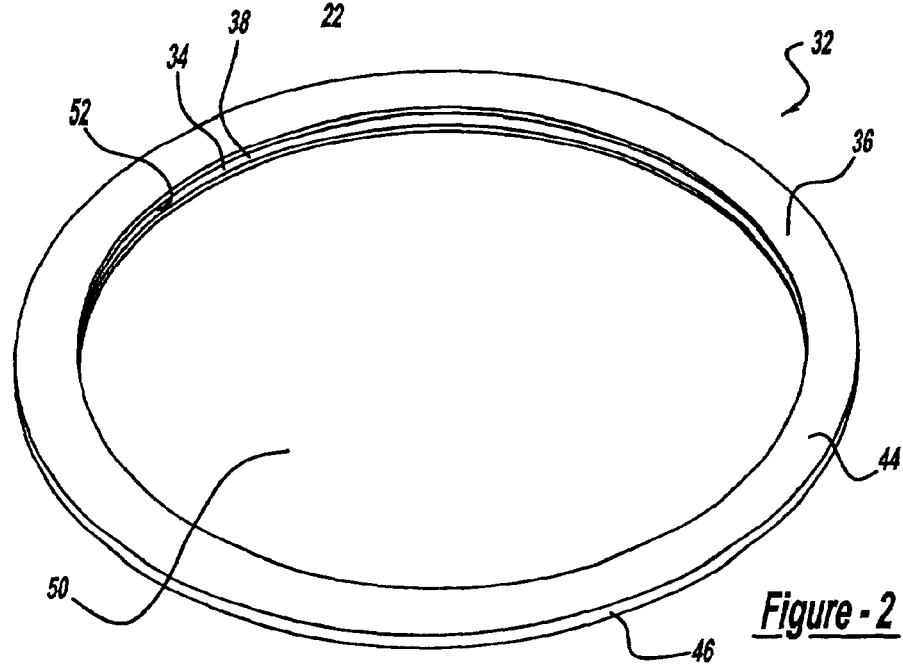
FIG. 2 is a perspective view of a protective cover of the present invention for the saw blade of FIG. 1.

Referring to FIG. 2, a protective cover 32 which provides a protective enclosure for the teeth 28 of the saw blade 20 is shown with the saw blade 20 removed for illustration purposes. The cover 32 is shown in FIG. 2 in its preferred embodiment sans the circular saw blade 20. The cover 32 is made from a heat shrinking material so that the cover 32 can envelop and protect the teeth 28 of a saw blade 20 when heat is applied to the cover 32, as will be explained in more detail below. The cover 32 has first and second portions 34, 36.

The first portion 34 has opposite inner and outer surfaces 38, 40. Likewise, the second portion 36 has opposite inner and outer surfaces 42, 44. As can be seen in FIG. 2, the first and second portions 34, 36 are joined along a peripheral edge 46 of the cover 32. The peripheral edge 46 defines the outer radial boundary of the cover 32. The peripheral edge 46 also defines the boundary between the first and second portions 34, 36. Preferably, as shown in FIG. 2, the peripheral edge 46 is circular and the cover 32 is also circular to fit on a circular saw blade 20.

As was mentioned above, the cover 32 is made from a heat shrinking material. As is known in the art, a large number of materials exhibit the characteristic of shrinking in response to heat being applied to the material. More particularly, a large variety of plastics exhibit the characteristics of shrinking when having heat applied. Therefore, the cover 32 can be made from a variety of materials. For example, the cover can be made from vinyl, polyethylene, or, preferably, from PVC. The PVC is preferred as the heat shrinking material for the cover 32 because it is light weight, requires a low temperature (approximately 100° F.) to move/shrink, and has an excellent strength to thickness ratio that allows a thin sheet of PVC to withstand contact with the teeth 28, with or without specialized tips, on the saw blade 20 without tearing. The heat shrinking material can have color added to it to provide a distinctive appearance for the saw blades 20 that have the cover 32. The thickness 48 (as shown in FIGS. 4A, 4B) of the first and second portions 34, 36 of the cover 32 will vary depending upon the needs of a particular application in which the cover 32 is utilized, as will be apparent to those skilled in the art. When using PVC as the heat shrinking material, the thickness 48 of the first and second portions 34, 36 of the cover 32 is preferably approximately 3.5 mils. However, it should be understood that the thickness 48 of the first and second portions 34, 36 of the cover 32 can vary from 3.5 mils and still be within the scope of the invention as defined by the claims. Therefore, as can be seen in FIGS. 4A–B, when the thickness 48 of the first and second portions 34, 36 is approximately 3.5 mils, the cover 32 adds approximately 7.0 mils to an overall thickness 49 of the saw blade 20. That is, the saw blade 20 having the protective cover 32 will have an overall thickness 49 that is generally equal to the thickness 48 of the first portion 34 plus the thickness 25 of the saw blade 20 plus the thickness 48 of the second portion 36.

The first portion 34, as can be seen in FIG. 4A, can be a solid portion that covers the entire first side 22 of the saw blade 20. Alternatively, and preferably, the first portion 34, as can be seen in FIGS. 2 and 4B, can have an opening 50. Preferably, the opening 50 is a central opening that is generally centered around an axial center line (not shown) of the cover 32.

Figure 3:
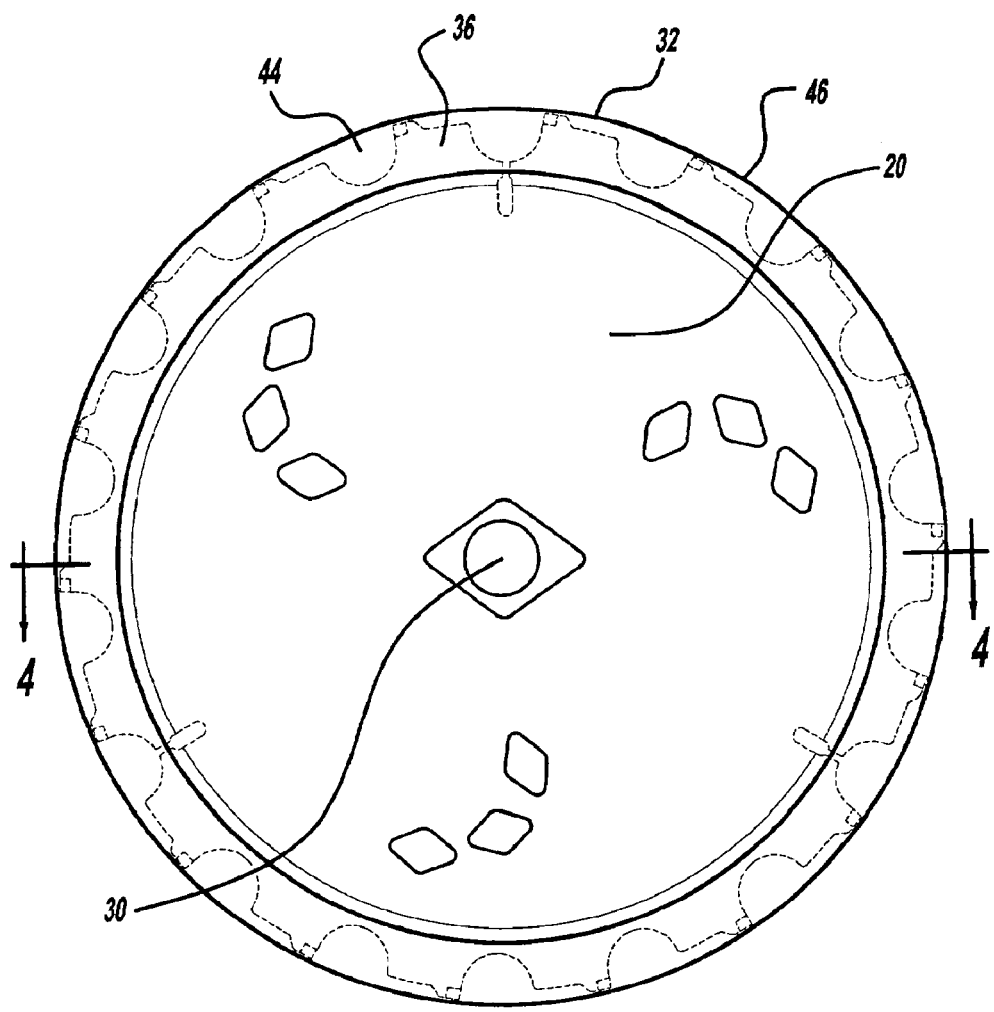
FIG. 3 is a top plan view of the saw blade of FIG. 1 within the protective cover of FIG. 2.

When the first portion 34 of the cover 32 has the central opening 50, the cover 32 has a ring shape, as shown in FIGS. 2, 3, and 4B. The ring shaped cover 32 has an annular channel 52 (best shown in FIG. 2) that is formed by the inner surfaces 38, 42 of the respective first and second portions 34, 36 and the peripheral edge 46 of the cover 32. As can be seen in FIG. 3, when the saw blade 20 is in the cover 32, the teeth 28 along with portions of the first and second sides 22, 24 of the saw blade 20 are within the annular channel 52 and protected by the cover 32. Because the cover 32 is made from a heat shrinking material and is formed by shrinking the cover 32 about the saw blade 20, as will be explained in more detail below, the annular channel 52 is snug against the saw blade 20 and provides a tight fitting cover 32 for the saw blade 20.

In contrast, as shown in FIG. 5, the prior art cover 54 used to protect teeth 28 of a saw blade 20 is not close fitting to the saw blade 20. The prior art covers 54 have a generally circular cross section that extends axially from the first and second sides 22, 24 of the saw blade 20 along with extending radially from the peripheral edge 26 of the saw blade 20. Because the prior art covers 54 are made from a circular tubing having a side wall 56 with a thickness 57, the prior art covers 54 have a significant amount of dead space 58 that surrounds the teeth 28 and the peripheral edge 26 of the saw blade 20 which needlessly increases the overall thickness 60 of the saw blade 20 having a prior art cover 54. That is, as shown in FIG. 5, the overall thickness 60 of the saw blade 20 with the prior art cover 54 includes not only the thickness of the saw blade 25 and two times the thickness 57 of the side walls 56, but also a portion of the dead space 58. Furthermore, the thickness 57 of the walls 56 of the prior art cover 54 are significantly larger than the preferred approximately 3.5 mils thickness 48 of the first and second portions 34, 36 of the cover 32 according to the principles of the present invention. The cover 32 of the present invention thereby provides a saw blade 20 with a protective cover 32 having an overall thickness 49 that is substantially less than the overall thickness 60 of a saw blade 20 having a prior art cover 54. In the preferred embodiment of the present invention, the overall thickness 49 of the saw blade 20 having the cover 32 of the present invention is approximately ⅓ the overall thickness 60 of a saw blade 20 having a prior art cover 54. The present invention thereby provides a saw blade 20 having a cover 32 that is close fitting and significantly reduces an overall thickness of a saw blade having a protective cover.

Optionally, but preferably, the cover 32 is preformed prior to the saw blade 20 being positioned on the heat shrinking material from which the cover 32 is made. The cover 32 is preformed so that the second portion 36 extends from the first portion 32 at an angle 62 relative to the first portion 34 so that the first and second portions 34, 36 of the covers 32 are not co-planar. The cover 32 can be preformed into a variety of configurations. For example, as shown in FIGS. 6A–C, the cover 32 can be preformed so that the angle 62 between the first and second portions 34, 36 of the cover 32 is a right angle 62, as shown in FIG. 6A, an acute angle 62, as shown in FIG. 6B, or an obtuse angle 62, as shown in FIG. 6C. The covers 32 shown in FIGS. 6A–C are cross sections of the cover 32 when it has been preformed.

As can be seen in FIGS. 6A–C, the preformed cover 32 has an opening 63 through which the saw blade 20 can be inserted so that a portion of the first side 22 of the saw blade 20 is in contact with the inner surface 38 of the first portion 34 of the cover 32. The opening 63 needs to be large enough so that the saw blade 20 can be inserted through the opening 63. It should be understood that the opening 63 does not need to be as large as a diameter (not shown) of the saw blade 20 to enable the saw blade 20 to be inserted through the opening 63. For example, in FIG. 6B, the opening 63 might not be as large as the diameter of the saw blade 20, however, the saw blade 20 can be inserted through the opening 63 by inserting the saw blade at an angle relative to the first portion 34 until the peripheral edge 26 of the saw blade 20 contacts the first portion 34 of the cover 32 along the peripheral edge 46 and the remainder of the saw blade 20 can then be inserted through the opening 63 or the opening 63 can be slightly elastically stretched to receive the saw blade 20. To enable the saw blade 20 to be inserted through opening 63 without stretching, the diameter (not shown) of the preformed cover 32 may need to be larger than the diameter of the saw blade 20 so that there is enough room in the opening 63 for the saw blade 20 to be inserted through the opening 63, as will be apparent to those skilled in the art. Therefore, the cover 32, when preformed so that the angle 62 is acute, as shown in FIG. 6B, may need to be slightly larger than the preformed cover 32 that has an angle 62 that is a right angle, as shown in FIG. 6A, or is an obtuse angle, as shown in FIG. 6C. While angle 62 of the preformed cover 32 is shown in FIGS. 6A–C as being either a right angle, an acute angle, or an obtuse angle, it should be understood that the angle 62 can vary along the peripheral edge 46 of the cover 32 from being an acute angle to being a right angle to being an obtuse angle, vice versa and/or other possible variations, as will be apparent to those skilled in the art, and still be within the scope of the invention as defined by the claims.

The peripheral edge 46 that separates the first and second portions 34, 36 of the cover 32 forms a corner 64 on an exterior of the cover 32 when the cover 32 is preformed. The corner 64 of the preformed cover 32 can be a rounded corner indicated as 65 in FIGS. 6A–C or can be comprised of straight segments so that the corner 64 is a sharp or acute corner indicated as 66, in FIGS. 6A–C. It should be understood that the corner 64 can vary from being a rounded corner 65 to being an acute corner 66 as the corner 64 extends around the cover 32 and still be within the scope of the invention as defined by the claims.

Figure 7:
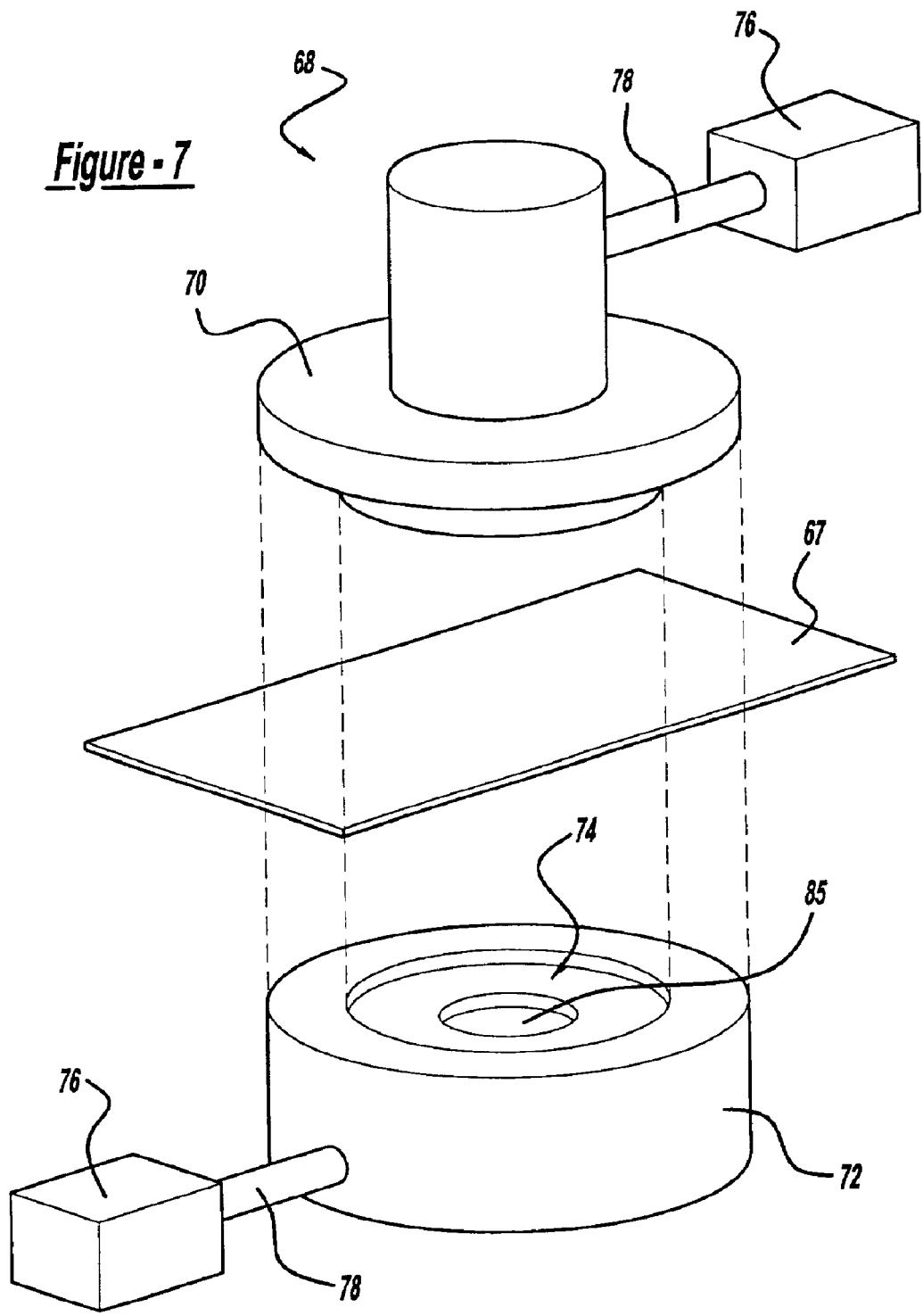
FIG. 7 is a perspective view of a molding machine used to preform the protective cover of the present invention.

The cover 32 can be purchased from a supplier of heat shrinking material already preformed to specific dimensions, or can be preformed from a sheet of heat shrinking material. The preforming of the cover 32 can be done in a variety of ways, as will be apparent to those skilled in the art. For example, as shown in FIG. 7, a sheet 67 of heat shrinking material can be placed in a mold 68 so that the preformed cover 32 can be made. The mold 68 has complementary male and female members 70, 72 that can be pressed together. A sheet 67 of heat shrinking material is positioned between the male and female members 70, 72. The male and female members 70, 72 are then pressed together so that the sheet 67 is pressed into a cavity 74 in the female member 72. The pressing together of the male and female members 70, 72 will make the sheet 67 deform into a predetermined shape as determined by the contours of the cavity 74 of the female member 72 and the configuration of the male member 70, as is known in the art.

The male member 70 and/or the female member 72 can then be heated to a predetermined temperature so that the sheet 67 within the mold 68 shrinks and will maintain the predetermined shape when removed from the mold 68. The heating of the male member 70 and/or the female member 72 of the mold 68 can be done in a variety of ways, as is known to those skilled in the art. For example, the male member 70 and/or the female member 72 can be provided with a flow of hot fluid, such as heated water or steam, from a heat source 76 via fluid supply lines 78. The male and/or female members 70, 72 could also be heated by running an electric current through the male and/or the female members 70, 72 that is supplied by the heat source 76. These methods of heating the components of the mold 68 are known in the art and other methods that will be apparent to those skilled in the art may also be employed without departing from the scope of the invention as defined by the claims.

After the mold 68 has been heated, the male and female members 70, 72 are separated and the preformed cover 32 can be removed from the mold 68. While the mold 68 has been described and is shown as being a press mold, it should be understood that the cover 32 can be preformed by a variety of molding machines, as will be apparent to those skilled in the art. For example, the sheet 67 can be preformed into the cover 32 by use of a vacuum mold and still be within the scope of the invention as defined by the claims.

Figure 8:
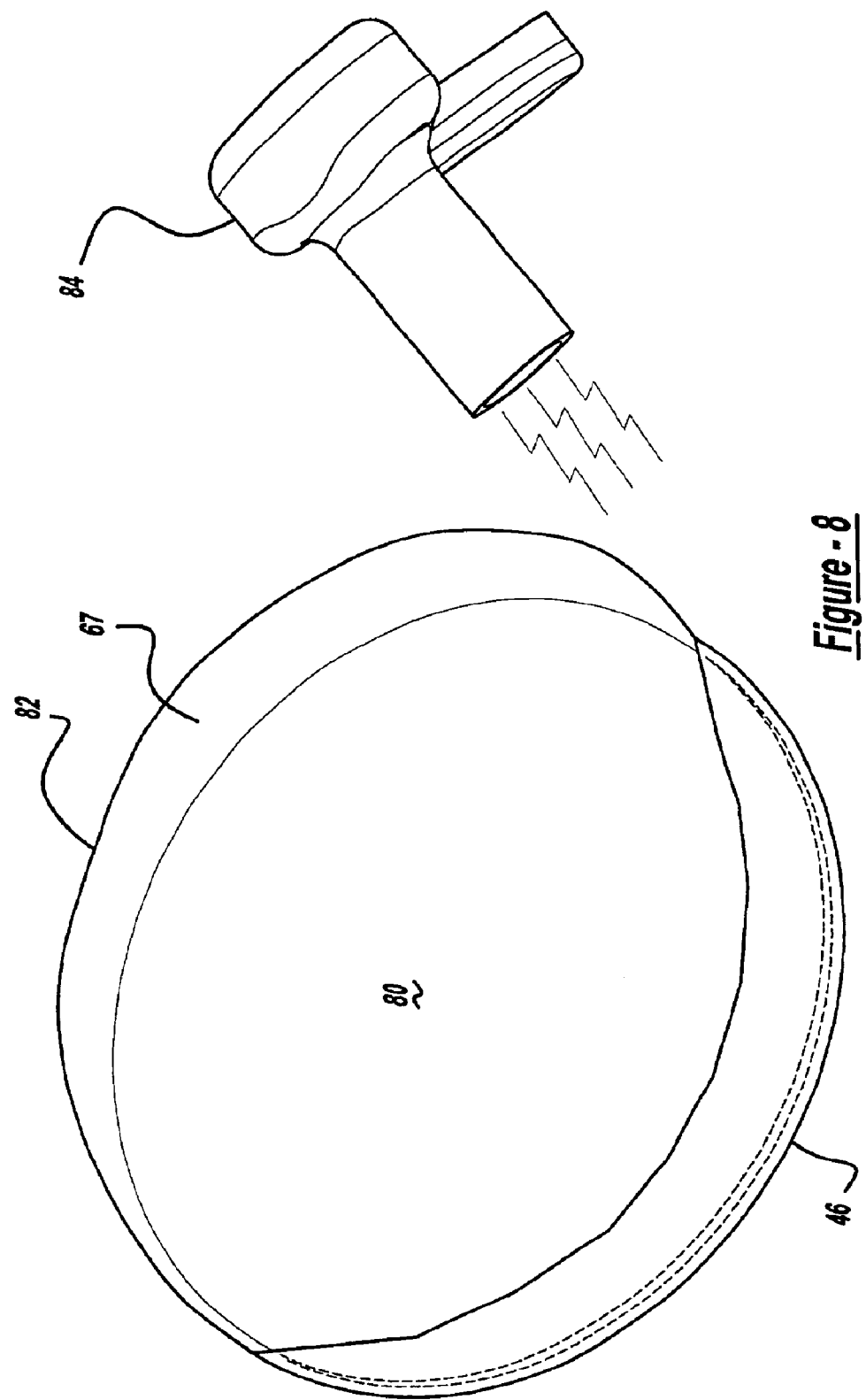
FIG. 8 is a perspective view of a heat gun and a blank being used to preform the protective cover of the present invention.

Alternatively, as shown in FIG. 8, the cover 32 can be preformed by placing a blank 80 on the sheet of heat shrinking material 67 and applying heat to the sheet 67. More specifically, the blank 80 is preferably slightly larger than the saw blade 20 and is positioned on the sheet 67 which is preferably circular. The sheet 67 is lifted along a peripheral edge 82 as heat is applied to the sheet 67. The application of heat to the sheet 67 while the sheet 67 is being lifted causes the sheet 67 to shrink and conform to the general shape of the blank 80. The sheet 67 is heated around the entire peripheral edge 82 until the desired preformed shape for the cover 32 is attained, as will be apparent to those skilled in the art. The heating of the sheet 67 can be provided in a variety of ways, as will be apparent to those skilled in the art. For example, as shown in FIG. 8, the heating of the sheet 67 can be done via a heat gun 84. If it is desired to not preform the cover 32, the saw blade 20 can be substituted for the blank 80 and the cover 32 formed by continuing to heat the cover 32 until the desired shaped of the cover 32 is attained by shrinking the cover 32 around the saw blade 20.

The opening 50 in the first portion 34 of the cover 32 can be made in the sheet 67 by the mold 68. That is, the female member 72 can have an opening 85 that is the same dimension as the desired opening 50. The male member 70 will then have a projection or cutting edge (not shown) that will fit within the opening 85 in the female member 72 and cut or press the opening 50 out of the sheet 67 so that the cover 32 has an opening 50 in the first portion 34. Alternatively, the sheet 67 can be precut, by a variety of methods as will be apparent to those skilled in the art, prior to or after being placed in the mold 68 or preformed with the blank 80.

After the cover 32 has been preformed, the saw blade 20 is then inserted into the cover 32 so that the cover 32 can be heat shrunk around the saw blade 20. As can be seen in FIG. 9A, which has a preformed cover 32 of the type shown in FIG. 6A, the saw blade 20 is positioned adjacent the opening 63 in the preformed cover 32. Next, as shown in FIG. 9B, the saw blade 20 is inserted through the opening 63 and into the preformed cover 32 so that at least one of the peripheral edge 26 of the saw blade 20 or a portion of the first side 22 of the saw blade 20 is in contact with the inner surface 38 of the first portion 34 of the cover 32. At this point, the preformed cover 32 with the saw blade 20 is ready to have heat applied to the cover 32 so that the cover 32 shrinks and covers a portion of the second side 24 of the saw blade 20 and protects the teeth 28. The heating of the cover 32 with the saw blade 20 can be performed in a variety of ways, as will be apparent to those skilled in the art. For example, a heated fluid can be forced across the cover 32 so that the cover 32 is heated and shrinks in response to the heat. The heated fluid can be provided in a variety of ways as will be apparent to those skilled in the art. For example, the heated fluid can be provided by a heat gun 84 that supplies a flow of heated air across the cover 32 and causes the cover 32 to shrink in response to the flow of heated air. A radiant heat source can also be used to heat the cover 32. The radiant heat source can be provided in a variety of ways, as will be apparent to those skilled in the art. For example, a heat lamp 92 can be used to provide radiant energy to the cover 32 so that the cover 32 is heated and shrinks. Optionally, the heat lamp 92 can be configured with an element that emits UV waves (light) that cause the cover 32 to shrink in response to the UV waves. Preferably, the cover 32 is uniformly heated so that the cover 32 shrinks uniformly.

As can be seen in FIG. 9C, as the cover 32 responds to being heated, the first and/or second portions 34, 36 shrink and the second portion 36 begins to fold over the first portion 34 and cover a portion of the second side 24 of the saw blade 20. As the cover 32 continues to shrink in response to the heat, the cover 32 will take the form shown in FIG. 9D. As can be seen in FIG. 9D, after the cover 32 has been exposed to heat for a sufficient duration of time, the saw blade 20 will be secured between the inner surfaces 38, 42 of the respective first and second portions 34, 36. The cover 32 thereby encloses the teeth 28 and provides a protective cover 32 to the saw blade 20.

Alternatively, the preformed cover 32 with the saw blade 20 positioned in contact with the first portion 34 can be placed on a conveyor or other moving means and passed through a heat tunnel 94, as shown in FIG. 10. The heat tunnel 94 can apply heat to the cover 32 in a variety of ways, as will be apparent to those skilled in the art. For example, the heat tunnel 94 can apply heat in the previously discussed ways, such as by forcing a heated fluid (preferably air) across the cover 32, applying radiant heat, and/or exposing the cover 32 to UV waves. When the cover 32 is made from PVC, the temperature to which the cover 32 needs to be heated is approximately 100° F. The rate at which the preformed cover 32 with the saw blade 20 passes through the heat tunnel 94 is dependent on, among other things, the temperature of the heat tunnel 94 and the efficiency with which the heating method transmits heat to the cover 32. When the rate at which the cover 32 with the saw blade 20 passes through the heat tunnel 94 is properly set, the cover 32 with the saw blade 20 exits the heat tunnel 94 with the cover 32 closely fitting and securing the saw blade 20. The cover 32 and the saw blade 20 may, optionally, then be cooled by cool air or other means in order to improve the rigidity of the heat shrinking cover for handling purposes.

The above described cover 32 and methods produce a saw blade 20 with a protective cover 32 that is close fitting and has an overall thickness 49 that is substantially less than the overall thickness 60 of saw blade 20 having a prior art cover 54. The lower overall thickness 49 enables a stack of a given number of saw blades 20 having the cover 32 of the present invention to be shorter than a stack of the same given number of saw blades 20 having the prior art cover 54. That is, as can be seen in FIGS. 11A–B, a stack height 96 of three saw blades 20 having the covers 32 of the present invention is substantially shorter than a stack height 98 of three saw blades 20 having the prior art cover 54. The present invention thereby enables a stack of a given number of saw blades 20 having the cover 32 of the present invention to occupy less space or have a lower stack height than a stack of the same given number of saw blades 20 having the prior art cover 54.

The lower stack height 96 enables a box 100 of a fixed dimension to hold more saw blades 20 having the cover 32 of the present invention than saw blades 20 having the prior art cover 54. As can be seen in FIGS. 12A–B, the box 100, as shown in FIG. 12B, can hold a significantly larger number of saw blades 20 having the cover 32 of the present invention than, as can be seen in FIG. 12A, the number of saw blades 20 having the prior art cover 54. As was discussed above and shown in FIGS. 11A–B, the present invention enables the three saw blades 20 having the cover 32 of the present invention to occupy approximately the same space as one saw blade 20 having the prior art cover 54. Therefore, as shown in FIGS. 12A–B, the box 100 is capable of holding fifteen saw blades 20 having the cover 32 of the present invention while only being capable of holding five saw blades 20 having the prior art cover 54. By increasing the number of saw blades 20 with a protective cover 32 that can be positioned in the box 100, the amount of box material utilized can be reduced. That is, only one box 100 is utilized for every fifteen saw blades 20 with the protective cover 32 while one box 100 is utilized for every five saw blades 20 having the prior art cover 54 that are sold. The above invention thereby provides a method of reducing the amount of box material per saw blade 20 with a protective cover that is sold which not only reduces the amount of wastage a purchaser must dispose of but also reduces the cost to the seller of the saw blades 20 by reducing the amount of packaging that is required for each saw blade 20 with a protective cover that is sold. In addition, with the protective cover 32 of the present invention a larger number of saw blades 20 can be displayed in a retail store as compared to the covers of the prior art.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A saw blade having a protective cover comprising:

a saw blade having opposite first and second sides, a peripheral edge and a plurality of teeth that extend along a portion of said peripheral edge; and a cover made of a heat shrinking material that shrinks and covers said teeth on said saw blade when heat is applied to said cover, said cover having first and second portions with opposite inner and outer surfaces, said first portion of said cover facing said first side of said saw blade, and said second portion being folded over said first portion with said inner surface of said second portion facing said second side of said saw blade and securing portions of said first and second sides of said saw blade and said teeth between said first and second portions, said heat shrinking material directly contacting tips of said teeth of said saw blade.

2. The saw blade having a protective cover of claim 1, wherein:

said saw blade is generally circular; and said first portion has a generally circular peripheral edge and said second portion extends from said first portion along said peripheral edge of said first portion.

3. The saw blade having a protective cover of claim 2, wherein:

said first portion has a central opening that is generally circular.

4. The saw blade having a protective cover of claim 3, wherein:

said first and second portions form a ring shape with an annular channel between said inner surfaces of said first and second portions in which portions of said first and second sides and said teeth of said saw blade reside.

5. The saw blade having a protective cover of claim 1, wherein:

said heat shrinking material is PVC.

6. The saw blade having a protective cover of claim 1, wherein said first portion of said cover is disposed against said first side of said saw blade.

7. The saw blade having a protective cover of claim 6, wherein said second portion of said cover is disposed against said second side of said saw blade.

* * * * *

UNITED STATES PATENT AND TRADEMARK OFFICE
CERTIFICATE OF CORRECTION

PATENT NO. : 6,874,635 B2
DATED : April 5, 2005
INVENTOR(S) : John Curtsinger

It is certified that error appears in the above-identified patent and that said Letters Patent is hereby corrected as shown below:

Title page,
Item [*] Notice, insert -- This patent is subject to a terminal disclaimer. --.

Signed and Sealed this

Thirtieth Day of August, 2005

JON W. DUDAS
*Director of the United States Patent and Trademark Office*